Patented Oct. 10, 1950

2,524,809

UNITED STATES PATENT OFFICE 2,524,809

PREPARATION OF HYDROGEL CATALYST

Charles N. Kimberlin, Jr., Baton Rouge, La., assignor to Standard Oil Development Company, a corporation of Delaware No Drawing. Application November 2, 1946, Serial No. 707,535

7 Claims. (Cl. 252—463)

The present invention is concerned with a process for the manufacture of improved catalysts. The invention is more particularly concerned with an improved process for the production of true hydrogels as compared to gelatinous precipitates. In accordance with my invention non-siliceous, true hydrogels of inorganic oxides are produced by treating a metallic salt solution with magnesia.

It is well known in the art to improve the quality of oils, particularly petroleum oils, by treating the same with catalysts under various operating conditions. For example, it is known to treat high-boiling petroleum oils with a catalyst comprising silicia at temperatures in the range from about 600° F. to about 1100° F. in order to crack the oil and to secure petroleum oil fractions boiling in the motor fuel boiling range. Oxides of other metals, as for example, magnesium, manganese, zirconium, beryllium and aluminum are employed in conjunction with the silica. A particularly desirable catalyst suitable for treating petroleum oils boiling in the gas-oil boiling range in order to produce lower boiling fractions comprises a silica-alumina catalyst.

Heretofore, these hydrogel silica catalysts have been prepared by various procedures. One method is to prepare the silica hydrogel by mixing an alkali silicate with an acid. The alkali silicate usually comprises a sodium silicate $$(Na_2O \cdot 3.25\ SiO_2)$$

solution having a specific gravity of about 1.2. This is mixed with a sulfuric acid having a specific gravity of about 1.19. The hydrosol may be impregnated with a soluble salt of the desired metal or the hydrosol may be allowed to gel and the resulting hydrogel washed and soaked in a solution comprising the salt of the desired metal or metals. One method employed for the preparation of a silica-magnesia catalyst is to prepare the hydrogel by the mixing of a silicate and sulfuric acid. The hydrogel is washed and mixed and granulated with magnesia and water. The mixture is passed through a colloid mill and homogenized. The catalyst is aged at room temperature for a period from about 24 to 72 hours. Elevated temperatures have been employed in which cases the aging time period is reduced to from about 5 to 10 hours. The catalyst is dried at a temperature in the range from about 200° F. to 270° F. Another method utilized for the preparation of the silica-magnesia catalyst is to prepare the silica hydrogel by mixing sulfuric acid and an alkali metal silicate. The silica hydrogel is washed and impregnated with magnesium sulfate. The impregnated silica hydrogel is treated with an ammonia solution to precipitate the magnesia. This may require a time period of from about 8 to 10 hours. A preferred method of preparing a catalyst comprising silica and magnesia is to add magnesia to a silica hydrosol or to a silica hydrosol impregnated with a metal salt, such as with an aluminum salt. The mixture is washed preferably at elevated temperatures. The general process comprises adding magnesia preferably as a slurry in water to a silica hydrosol which has been impregnated with a salt, as for example, with an aluminum salt. The action of magnesia is to neutralize the free acid, thus causing rapid setting of the hydrosol to the hydrogel and also to decompose the aluminum salt or other salt present causing precipitation of alumina within and throughout the gel. Excess magnesia used over these requirements remains in the finished product as magnesia.

My process is particularly directed toward the preparation of true nonsiliceous hydrogels, as compared to gelatinous precipitates, of inorganic oxides. True hydrogels may be defined as precipitates which occupy the entire volume of the solution from which they are formed, and possess a definitely rigid structure and when fractured will show a conchoidal fracture as compared to an irregular and ragged edge fracture. On the other hand, gelatinous precipitates occupy only a part of the volume of the solution from which they are formed and have no rigidity of structure and do not show conchoidal fracture. On the other hand, both hydrogels and gelatinous precipitates can usually be dried to solids which have a gel structure. However, for many purposes, such as adsorptive agents or catalysts or catalytic carriers, the true hydrogels show distinct advantages since the dried gel prepared from the true hydrogels usually possesses a more open and porous structure as compared to the gels produced from gelatinous precipitates. Furthermore, the hydrogels can be more easily washed free of soluble impurities due to the tendency of the gelatinous precipitates to peptize upon washing. A distinct and further advantage of hydrogels is that due to the rigid structure they can be formed into high quality spheres.

Heretofore, a number of specialized methods have been employed for the preparation of hydrogels with which the present invention is concerned. For example, an alumina hydrogel has been produced by the treatment of a peptized alumina sol with a weak acid or base. Another method used for the preparation of hydrogels of the type with which the present invention is concerned is to add ethylene oxide, propylene oxide, or an equivalent oxide to a metallic salt solution. This is an old and well known method and the hydrogels produced are of excellent quality. This process, however, has the disadvantage that it is limited to halide starting materials, the reagents are expensive, poisonous, highly inflammable and difficult to handle. For example, ethylene oxide is a gas and propylene oxide is a volatile liquid, the usefulness of which is limited by its low solubility in salt solutions. Furthermore, the product of the reaction, ethylene chlorohydrin is poisonous.

Another method heretofore employed for the preparation of hydrogels is to add hexamethylenetetramine to a metallic salt solution. Although this method also produces satisfactory hydrogels, it cannot be used for example in the preparation of desirable hydrogels, as for example alumina hydrogel. Furthermore, the method is expensive since it involves a wastage of one and one-half mols of formaldehyde for each equivalent weight of oxide formed by means of hexamethylenetetramine. Furthermore, the formation of by-product formaldehyde is not desirable.

As stated heretofore, I have now discovered that true hydrogels of inorganic oxides may be readily prepared by treating a metallic salt solution with magnesia. The oxides may be oxides of metals of groups I, II, IV, VI and VIII of the periodic table. Suitable oxides are, for example, hydrous oxides of aluminum, chromium, titanium, iron, tin, thorium and zirconium.

The method of preparation is to start with a water soluble salt of the metals. These metals, as stated heretofore, are preferably selected from groups III, IV, VI and VIII of the periodic table. The salts generally comprise the chlorides, the sulfates and the nitrates. Satisfactory salts are, for example, aluminum chloride, aluminum sulfate, aluminum nitrate, chromium chloride, chromium sulfate, chromium nitrate, iron sulfate, zirconium nitrate, tin chloride, thorium nitrate and the like.

The water soluble salt of the satisfactory metals is dissolved in water. It is preferred that the salt solution be relatively concentrated and preferably that the concentration be at least 80% of the saturation value. A water slurry of magnesia is prepared and the magnesia slurry mixed with the salt solution. In general it is preferred that the concentration of the salt solution should be such that the product will contain at least 50 grams of the metal oxide per liter. If too low a concentration is employed there results a hydrosol of the hydrous oxide which can be freed of soluble magnesium salts by dialysis.

The following reactions serve to illustrate my invention:

$$2AlCl_3 + 3MgO = Al_2O_3 + 3MgCl_2$$
$$2Cr(NO_3)_3 + 3MgO = Cr_2O_3 + 3Mg(NO_3)_2$$
$$SnCl_4 + 2MgO = SnO_2 + 2MgCl_2$$
$$Fe_2(SO_4)_3 + 3MgO = Fe_2O_3 + 3MgSO_4$$

The hydrogels formed in accordance with my process may be washed free of soluble magnesium salts either before or after drying. Also, although it is preferred to employ a water slurry of magnesia, dry magnesia powder may be introduced per se into the salt solution. The magnesia can be used either in stoichiometrical quantity or in larger quantities provided free magnesia in the final product is not objectionable. On the other hand, if excess magnesia has been used, the excess can subsequently be removed by treating the hydrogel or the dried gel with ammonium chloride or other weakly acidic solutions.

The time required for the hydrogel to form depends upon various factors. The time of set will be dependent on operating conditions, such as the nature of the salt used as a starting material, the concentration of the salt employed, the temperature of the set (high temperature favoring more rapid setting), and the quantity of magnesia employed. The time of setting will also vary, depending upon the quality of magnesia used. The following tabulation lists the results of operations in which 100 ccs. of a 1 M $Al_2(SO_4)_3$ solution was treated at room temperatures with a slurry of 12 grams of 200 mesh magnesia in 40 ccs. of water.

| Type of magnesia | Set time, seconds |
|---|---|
| A | 360 |
| B | 10 |
| C | 125 |

The foregoing magnesias differ in the temperature at which they were calcined, the higher temperature of calcination resulting in the longer set time. The temperature of calcination is in the range from about 700° F. to 2000° F.

Certain hydrous oxides cannot be formed as hydrogels by my process, as for example oxides of copper, cobalt and zinc. However, these hydrous oxides can be made a substantial part of a true hydrogel by mixing the salt solution with the salt of a metal which readily forms a hydrogel before treatment with magnesia. By this process it is possible to produce a hydrogel of composition (dry basis) $ZnAl_2O_4$ which serves as a useful support for certain reforming or hydroforming catalysts.

The temperature I prefer to use in the treatment of the salt solution with magnesia is in the range from about 50° F. to 200° F. A particularly desirable process for rapidly producing hydrogels is to treat the salt solution with magnesia at a temperature in the range from about 125° F. to 200° F., particularly at about 150° F.

Although I do not wish to limit my invention by the mechanism of the reaction, I consider the mechanism of hydrogel formation when magnesia is added to a salt solution to be as follows:

Magnesia when added to an acidic solution, due to its low rate of solubility, gradually raises the pH throughout the solution without localized regions of high pH such as are unavoidable when using more soluble bases. This condition is ideal for the formation of true hydrogels. On the other hand, the localized regions of high pH obtained when treating a salt solution with a more soluble base are favorable to the formation of gelatinous precipitates. Magnesia is the preferred reagent, but other difficultly soluble bases such as the alkaline earth carbonates, silver or lead oxide, etc., might be useful under special circumstances. For example, I have prepared a true hydrogel of alumina by treating a solution of aluminum chloride with the stoichiometric amount of powdered calcium carbonate. However, this hydrogel suffered the disadvantage of being full of bubbles due to the carbon dioxide released by the reaction.

I wish to emphasize that my invention is particularly adapted for the preparation of high quality sphere hydrogels.

In order to further illustrate my invention, the following examples are given:

Examples 1

A slurry of 12.0 g. of MgO in 40 cc. $H_2O$ was added with stirring to 100 cc. of 1 M $Al_2(SO_4)_3$ solution at room temperature. The mixture was stirred for 125 seconds at the end of which time it set suddenly to a firm hydrogel. The latter was aged overnight, washed free of magnesium sulphate with distilled water, and dried to an alumina gel of high quality.

Example 2

The alumina hydrogel described in Example 1 was produced in the form of spheres by allowing the mixture to set while descending a column of lubricating oil in the form of drops. The hydrogel spheres were aged overnight, washed in distilled water, and dried slowly to prevent breakage by heating to about 160° F. in moist air. The dried gel beads were then heated slowly to 1000° F.

Example 3

To 100 cc. of a stirred solution of 6 N $AlCl_3$ at room temperature was added a slurry of 24 g. MgO in 40 cc. of $H_2O$. Within 6 minutes, the mixture set to a firm hydrogel of alumina which contained a considerable excess of magnesia.

Example 4

To a stirred solution of 72 cc. of 1 M $Al_2(SO_4)_3$ and 28 cc. of 2.59 M $ZnSO_4$ at room temperature was added a slurry of 11.6 g. MgO in 40 cc. $H_2O$. The mixture set to a firm hydrogel in 75 seconds.

Example 5

The hydrogel of Example 4 was produced in the form of spheres by permitting the mixture to set while descending a column of lubricating oil in the form of drops. The hydrogel was aged overnight, washed in distilled water, and dried slowly by heating to about 160° F. in a moist atmosphere. The dried gel beads were heated to 1000° F.

Example 6

A slurry of 20 g. MgO in 40 cc. $H_2O$ was added with stirring to 100 cc. of 7.5 N $Cr(NO_3)_3$ at room temperature. After 500 seconds, the mixture set to a firm hydrogel. The later was aged overnight, washed, and dried to give an excellent dry gel of chromia, which still, however, contained some magnesia due to the excess magnesia used.

Example 7

A slurry of 24 g. MgO in 40 cc. $H_2O$ was added with stirring to 100 cc. 6 N $FeCl_3$ at room temperature. The mixture set to a hydrogel after 180 seconds.

Example 8

A slurry of 8 g. MgO in 40 cc. $H_2O$ was added with stirring to 100 cc. of 1 M $SnCl_4$. The mixture set to a hydrogel in 22 seconds.

Example 9

A slurry of 12 g. MgO in 40 cc. $H_2O$ was added with stirring to 100 cc. 1.5 M $TiCl_4$. The mixture set to a hydrogel in 10 seconds.

The process of my invention is not to be limited by any theory as to mode of operation, but only in and by the following claims.

I claim:

1. An improved process for the preparation of true hydrogels which consists essentially in preparing an aqueous solution of a soluble salt of a metal selected from the group consisting of aluminum, chromium and iron in amount sufficient to produce a concentration in the product of at least 50 g. of metal oxide per liter and adding to the said solution at least a stoichiometrically equivalent amount of magnesia to form a true hydrogel of the said metal.

2. The process defined by claim 1 wherein the soluble salt of the metal selected is an aluminum salt.

3. The process defined by claim 1 wherein the soluble salt of the metal selected is a chromium salt.

4. The process defined by claim 1 wherein the soluble salt of the metal selected is an iron salt.

5. The process as set forth in claim 1 wherein a mixture of soluble salts is used to produce the indicated metal oxide concentration in the product.

6. The process set forth in claim 1 wherein a temperature of from about 125° F. to 200° F. is employed and the hydrogel is aged and then washed and dried.

7. The process as set forth in claim 1 wherein a mixture of soluble salts of aluminum and zinc of combined concentration sufficient to produce the indicated concentration of metal oxide in the product are employed.

CHARLES N. KIMBERLIN, Jr.

REFERENCES CITED

The following references are of record in the file of this patent:

UNITED STATES PATENTS

| Number | Name | Date |
|---|---|---|
| 2,156,903 | Ruthruff | May 2, 1939 |
| 2,255,607 | Ayers et al. | Sept. 9, 1941 |
| 2,383,643 | Fulton et al. | Aug. 28, 1945 |
| 2,408,146 | Kearby | Sept. 24, 1946 |
| 2,412,958 | Bates et al. | Dec. 24, 1946 |

FOREIGN PATENTS

| Number | Country | Date |
|---|---|---|
| 392,954 | Great Britain | May 22, 1933 |